(12) United States Patent
Kikuchi

(10) Patent No.: US 6,859,716 B2
(45) Date of Patent: Feb. 22, 2005

(54) TRAVEL FOLLOWING SYSTEM FOR VEHICLE

(75) Inventor: Hayato Kikuchi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/449,690

(22) Filed: Jun. 2, 2003

(65) Prior Publication Data

US 2004/0044460 A1 Mar. 4, 2004

(30) Foreign Application Priority Data

Aug. 6, 2002 (JP) .................................... 2002-229089
Feb. 19, 2003 (JP) .................................... 2003-041435

(51) Int. Cl.[7] ............................ G06F 19/00; B60T 8/32
(52) U.S. Cl. ........................ 701/96; 701/23; 123/352; 123/319; 180/170; 340/903
(58) Field of Search ........................ 701/23, 96, 93; 123/352, 319, 349, 350; 180/169, 179, 170, 167, 168; 340/903, 436; 342/70

(56) References Cited

U.S. PATENT DOCUMENTS 5,957,992 A * 9/1999 Kiyono ........................ 701/93
6,226,588 B1 * 5/2001 Teramura et al. ............. 701/93
2002/0134602 A1 * 9/2002 Kobayashi et al. ......... 180/169
2002/0152015 A1 * 10/2002 Seto ............................ 701/96
2003/0028311 A1 * 2/2003 Seto et al. .................... 701/96

FOREIGN PATENT DOCUMENTS

JP    11-48826    2/1999

* cited by examiner

Primary Examiner—Thomas G. Black
Assistant Examiner—Ronnie Mancho
(74) Attorney, Agent, or Firm—Arent Fox PLLC

(57) ABSTRACT

A travel following system includes a lower limit vehicle speed setting device, an upper limit vehicle speed setting device, a vehicle speed control device, and a control start commanding device. The vehicle speed control device is adapted to discontinue vehicle speed control at a vehicle speed between the lower limit vehicle speed and a vehicle speed in a stopped state. The vehicle speed control device is also adapted to ensure that vehicle speed control is discontinued when the vehicle speed becomes equal to or higher than the upper limit vehicle speed, and vehicle speed control is suspended until operation of the control start commanding device. Thus, a moderate tension is provided to the driver during operation of the travel following system so that braking operation can be easily conducted and starting of the vehicle based on the driver's will can be carried out without switching operation by the driver.

6 Claims, 9 Drawing Sheets

FIG.8

| STATE | INDICATING LAMP | DISPLAY |
|---|---|---|
| SYSTEM OFF | Follow MAIN 35<br>Follow 36 | ALL INDICATIONS ON DISPLAY TURNED OFF |
| SYSTEM ON | Follow MAIN 35<br>Follow 36 | ALL INDICATIONS ON DISPLAY TURNED OFF |
| STANDBY | Follow MAIN 35<br>Follow 36 | 37, 38 |
| TRAVEL FOLLOWING CONTROL | Follow MAIN 35<br>Follow 36 | 37, 39, 38 |
| BRAKE WARNING | Follow MAIN 35<br>Follow 36 | 37, 40, 38 BRAKE, 39 |
| TROUBLE WARNING | Follow MAIN 35<br>Follow 36 | 37, 41 OFF |

FIG.9A 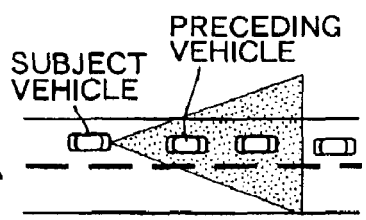 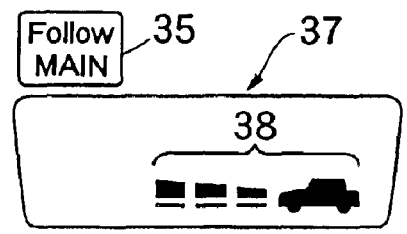
FIG.9B 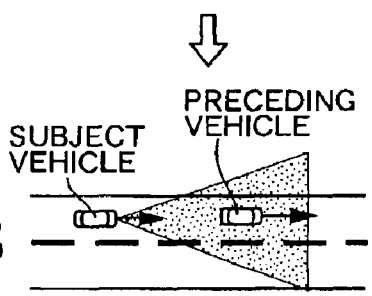 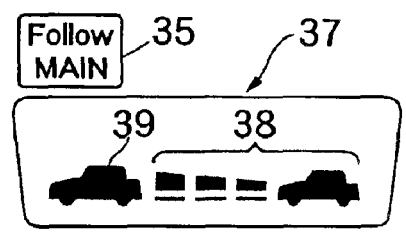
FIG.9C 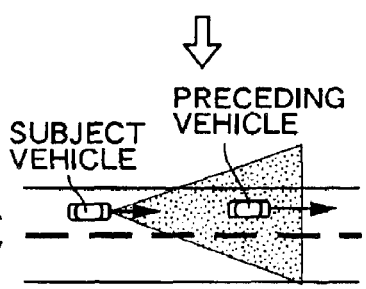 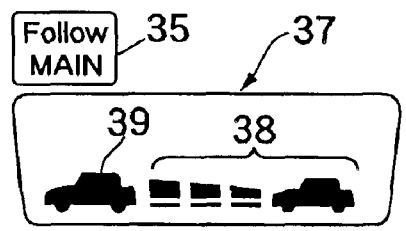
FIG.9D 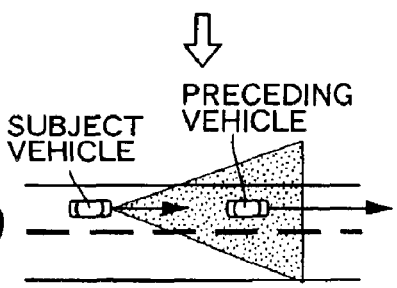 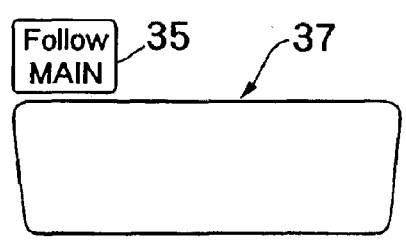

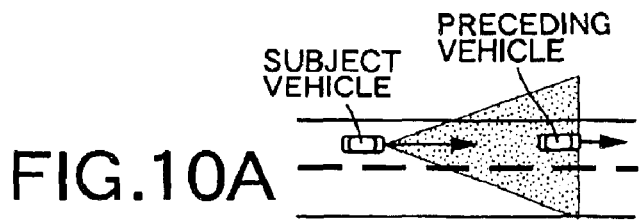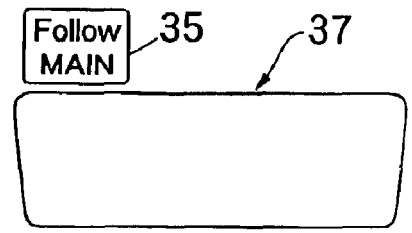
FIG.10A
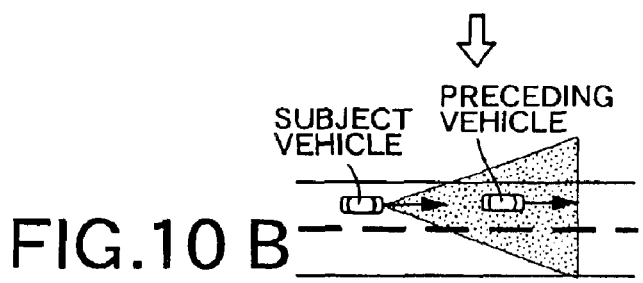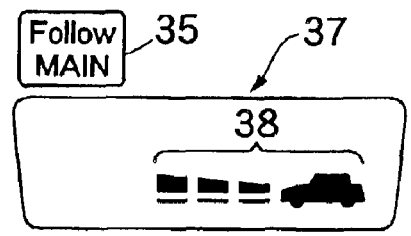
FIG.10B
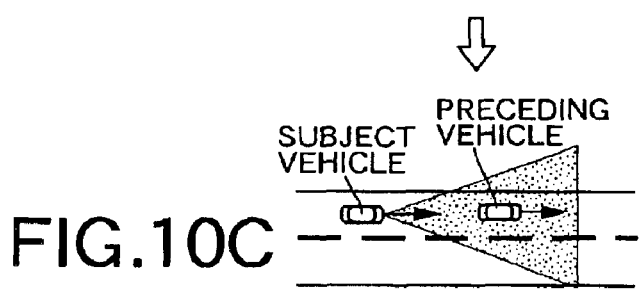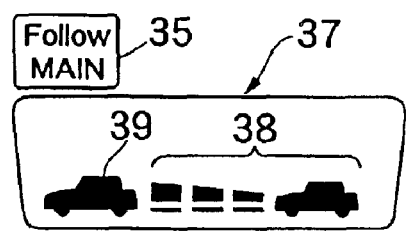
FIG.10C
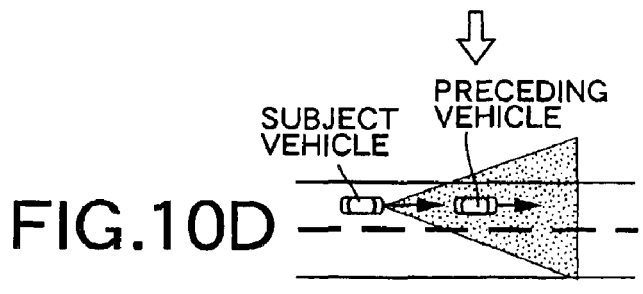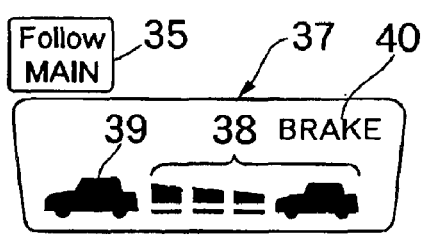
FIG.10D
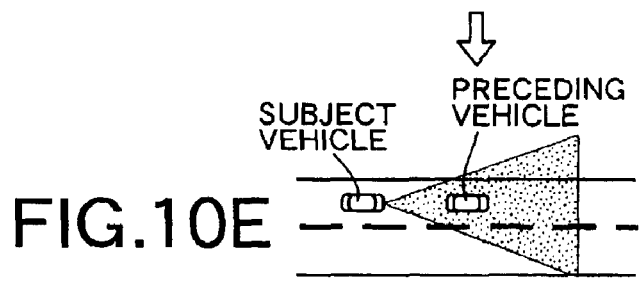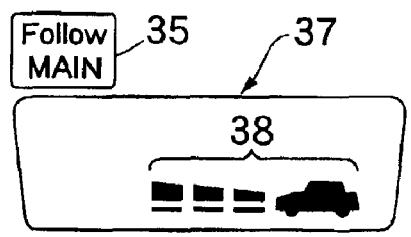
FIG.10E

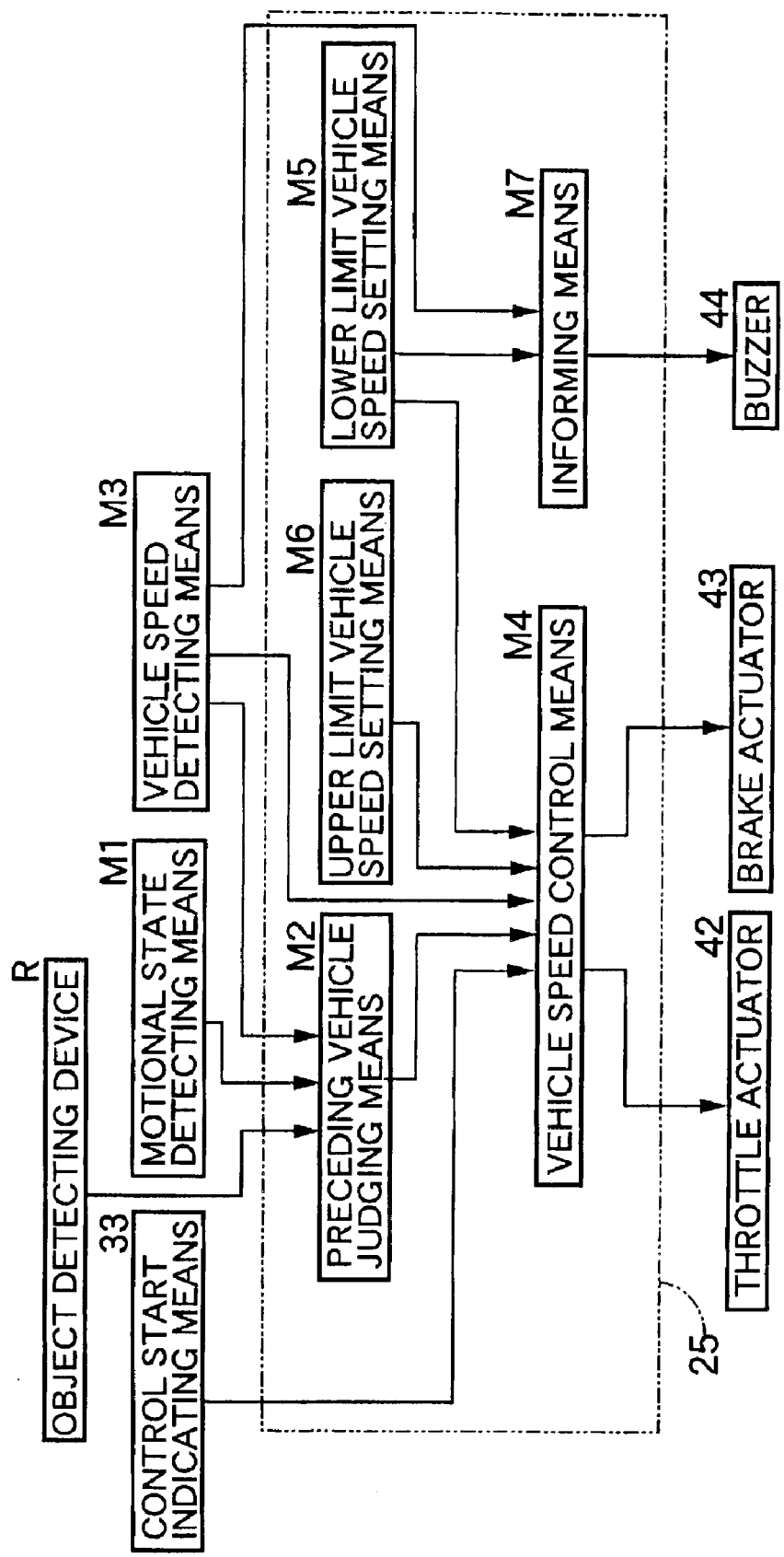

TRAVEL FOLLOWING SYSTEM FOR VEHICLE

BACKGROUND OF THE INVENTION

1. Field of the Invention

The present invention relates to a travel following system for a vehicle, which is designed to allow the subject vehicle to travel following a preceding vehicle in a relatively low speed range.

2. Detailed Description of the Related Art

A Stop & Go system having the following functions is known as a conventional travel following system operated in a lower speed range:

(1) when a preceding vehicle has been detected in a speed range from the stopped state to a predetermined vehicle speed, the subject vehicle is allowed to travel following the preceding vehicle;

(2) when the subject vehicle is stopped automatically following the stopping of the preceding vehicle during operation of the system, the stopped state of the subject vehicle is maintained;

(3) the driver is informed of the starting of the preceding vehicle;

(4) the starting of the operation of the system is carried out by a switching operation by the driver rather than automatically: and (5) a condition for canceling the system is any of the cases where
the driver has carried out the braking operation,
the driver has carried out an accelerating operation,
sight of the preceding vehicle has been missed, and
another vehicle has intruded into between a vehicle provided with the system (which will be referred to as a subject vehicle) and a preceding vehicle.

One example of a Stop & Go system is known from Japanese Patent Application Laid-open No. 11-48826.

In the above-described conventional Stop & Go system, when a preceding vehicle is stopped, the subject vehicle is stopped automatically without a braking operation by a driver. For this reason, if the driver excessively relies on the system to be neglectful of the braking operation, there is a possibility that the braking operation by the driver is retarded when the automatic braking cannot cope with a case where another vehicle or a pedestrian dashes out from the side or a case where a preceding vehicle is suddenly stopped.

In the case where the system is operated from a state in which the subject vehicle has been once stopped, if the driver tries to start the subject vehicle automatically in response to the starting of a preceding vehicle, it matters whether or not the driver is ready to drive the vehicle. In the conventional system, in order to confirm a driver's will, the driver is informed of that a preceding vehicle has been started, and the system is operated when a switch is turned on by the driver, However, if the system is designed as described above, there is a possibility that a switching operation is troublesome and the convenience of the system is detracted. If the switching operation by the driver who has been informed of the starting of the preceding vehicle is retarded, the subject vehicle may be left behind the preceding vehicle, and cannot travel following the preceding vehicle in some cases, For this reason, the driver is forced to be tense so as not to retard the switching operation. Also in this case, the convenience is detracted.

SUMMARY OF THE INVENTION

The present invention has been accomplished with the above-described circumstance in view, and it is an object of the present invention to ensure that a moderate tension feeling is provided to a driver during operation of a travel following system so as to easily conduct a braking operation, and the starting of a vehicle based on a driver's will can be carried out without a switching operation by the driver.

According to the present invention, the above object is achieved by an arrangement shown in a diagram in FIG. 11 corresponding to claims.

According to a first feature of the present invention, there is proposed a travel following system comprising: an object detecting device for detecting an object in a direction of travel of a subject vehicle, a motional state detecting means for detecting a motional state of the subject vehicle, a preceding vehicle judging means for judging a preceding vehicle which the subject vehicle is to follow, based on outputs from the object detecting device and the motional state detecting means, a vehicle speed detecting means for detecting a vehicle speed of the subject vehicle, and a vehicle speed control means for controlling the vehicle speed of the subject vehicle so that the subject vehicle follows the preceding vehicle judged by the preceding vehicle judging means, wherein said system further includes a lower limit vehicle speed setting means for previously setting a lower limit vehicle speed to control the vehicle speed by the vehicle speed control means, said vehicle speed control means being adapted to ensure that a vehicle speed control is discontinued at a vehicle speed between the lower limit vehicle speed set by the lower limit vehicle speed setting means and a vehicle speed in a stopped state, thereby permitting a vehicle speed control conducted by a driver, and the vehicle speed control is carried out at a vehicle speed exceeding the lower limit vehicle speed in a state in which an accelerating or decelerating operation is not conducted by the driver.

With the above arrangement, the vehicle speed control is discontinued at the vehicle speed between the lower limit vehicle speed set by the lower limit vehicle speed setting means and the vehicle speed in the stopped state, thereby permitting a vehicle speed control conducted by the driver, and the vehicle speed control is carried out at the vehicle speed exceeding the lower limit vehicle speed in the state in which the accelerating or decelerating operation is not conducted by the driver. Therefore, when the vehicle speed of the subject vehicle is reduced to a level equal to or lower than the lower limit vehicle speed with the deceleration of the preceding vehicle, the vehicle is stopped by a spontaneous braking operation by the driver. As a result, it is prevented that the driver excessively relies on the system to be neglectful of the braking operation, and a prompt braking operation by the driver is possible in case of emergency.

According to a second feature of the present invention, in addition to the first feature, the system further includes an upper limit vehicle speed setting means for previously setting an upper limit vehicle speed to control the vehicle speed by the vehicle speed control means, and a control start commanding means for instructing the vehicle speed control means to start the vehicle speed control upon operation by the driver, said vehicle speed control means being adapted to ensure that the vehicle speed control is discontinued when the vehicle speed becomes a level equal to or higher than the upper limit vehicle speed, and even if the vehicle speed becomes again lower than the upper limit vehicle speed, the vehicle speed control is suspended until the operation of the control start commanding means is conducted.

With the above arrangement, the vehicle speed control is started by the driver operating the control start commanding means, and when the vehicle speed becomes the level equal to or higher than the upper limit vehicle speed previously set, the vehicle speed control is discontinued. Even if the vehicle speed is again lower than the upper limit vehicle speed, the vehicle speed control is suspended until the operation of the control start commanding means is conducted. Therefore, it is possible to prevent an unexpected vehicle speed control conducted by the driver from being started to provide an uncomfortable feeling, when the vehicle becomes again lower than the upper limit vehicle speed after the vehicle speed becomes a level equal to or higher than the upper limit vehicle speed to discontinue the vehicle speed control. In addition, after the driver operates the control start commanding means to start the vehicle speed control, the vehicle speed control is continued as long as the vehicle speed is the upper limit vehicle speed or more. Therefore, it is unnecessary to frequently operate the control start commanding means, leading to an enhancement in convenience.

According to a third feature of the present invention, in addition to the first or second feature, the system further includes an informing means for informing the driver that the vehicle speed is immediately before becoming a level equal to or lower than the lower limit vehicle speed, or that the vehicle speed has reached the level equal to or lower than the lower limit vehicle speed.

With the above arrangement, the driver is informed of that the vehicle speed is immediately before becoming a level equal to or lower than the lower limit vehicle speed, or that the vehicle speed has reached the level equal to or lower than the lower limit vehicle speed. Therefore, the driver can recognize that the spontaneous vehicle speed control is possible.

According to a fourth feature of the present invention, in addition to the third feature, the informing means informs the driver of contents urging the driver for a decelerating operation.

With the above arrangement, when the vehicle speed is immediately before becoming a level equal to or lower than the lower limit vehicle speed, or when the vehicle speed has reached the level equal to or lower than the lower limit vehicle speed, the driver is informed of contents urging the driver for a decelerating operation. Therefore, the driver can carry out the decelerating operation for immediately stopping the vehicle.

A set switch 33 in an embodiment corresponds to the control start commanding means of the present invention.

BRIEF DESCRIPTION OF THE DRAWINGS

FIG. 8 is a diagram showing turned-on states of the indicating lamp and the display in various situations.

FIG. 9 is a diagram for explaining the operation when a vehicle is changed from a stopped state to a travel following controlled state.

FIG. 10 is a diagram for explaining the operation when a preceding vehicle has been stopped during a travel following control.

FIG. 11 is a block diagram (a diagram corresponding to claims) of a control system for the travel following system.

DESCRIPTION OF THE PREFERRED EMBODIMENT

A preferred embodiment of the present invention will now be described with reference to the accompanying drawings.

Figure 1:
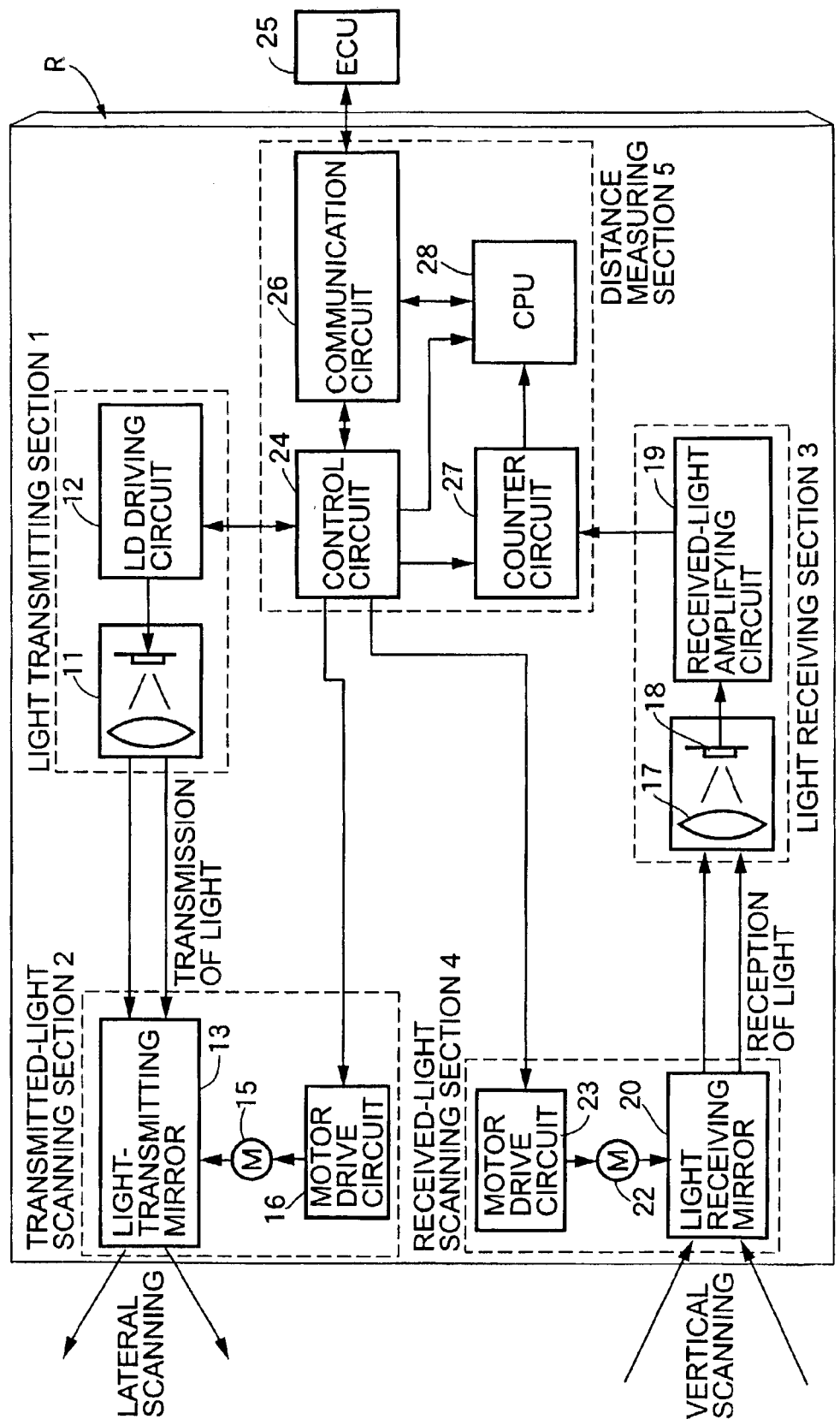
FIG. 1 is a block diagram of an object detecting device.
Figure 2:
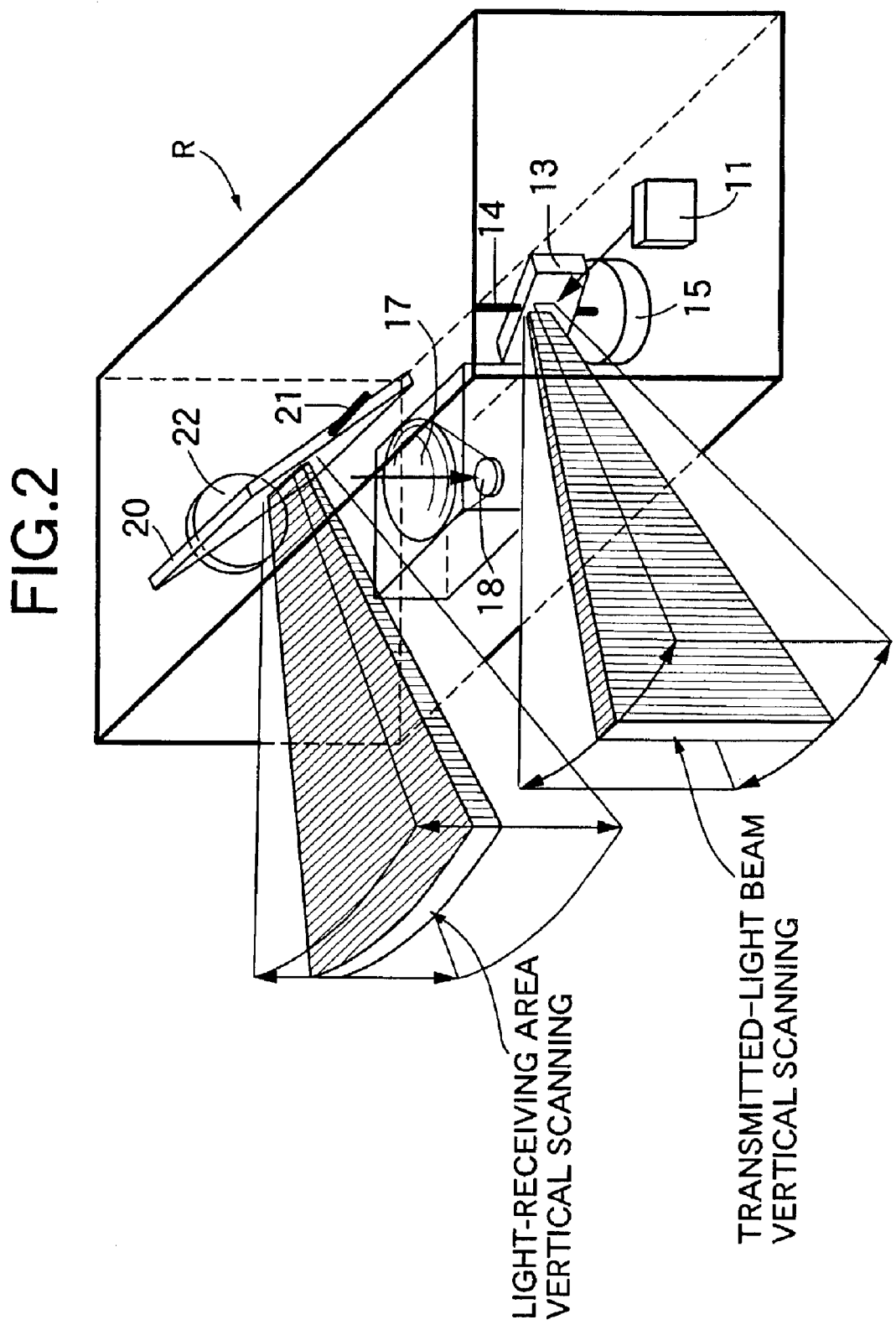
FIG. 2 is a perspective view of the object detecting device.

As shown in FIGS. 1 and 2, an object-detecting system R for detecting the distance and direction to an object ahead of a subject vehicle includes a laser radar device, and comprises a light transmitting section 1, a transmitted-light scanning section 2, a light-receiving section 3, a received-light scanning section 4 and a distance-measuring section 5. The light-transmitting section 1 includes a laser diode 11 integrally provided with a light-transmitting lens, and a laser diode drive circuit 12 for driving the laser diode 11. The transmitted-light scanning section 2 includes a light-transmitting mirror 13 for reflecting the laser output by the laser diode 11, a motor 15 for reciprocally turning the light-transmitting mirror 13 about a vertical axis 14, and a motor drive circuit 16 for controlling the driving of the motor 15. A light beam emitted from the light-transmitting mirror 13 has a vertically elongated pattern having a limited lateral width, and is moved reciprocally in a lateral direction at a predetermined cycle to scan an object.

The light-receiving section 3 includes a light-receiving lens 17, a photodiode 18 adapted to receive a reflected wave converged by the light-receiving lens 17 to convert the reflected wave into an electric signal, and a received-light amplifying circuit 19 for amplifying a signal output from the photodiode 18. The received-light scanning section 4 includes a received-light mirror 20 adapted to reflect a reflected wave from the object to introduce it to the photodiode 18, a motor 22 for reciprocally turning the received-light mirror 20 about a lateral axis 21, and a motor drive circuit 23 for controlling the driving of the motor 22. A light-receiving area having a laterally elongated pattern having a limited vertical width is moved reciprocally in a vertical direction at a predetermined cycle by the received-light mirror 20 to scan the object.

The distance measuring section 5 includes a control circuit 24 for controlling the laser diode drive circuit 12 and the motor drive circuits 16 and 23, a communication circuit 26 for communicating with an electronic control unit 25 controlling a travel following system (which will be hereinafter referred to as "the following system"), a counting circuit for counting a time from the transmission of the laser to the reception of the laser, and a central calculation device 28 for calculating a distance from the subject vehicle to an object and a direction to the object.

Thus, an area where the vertically elongated transmitted-light beam and the laterally elongated transmitted-light beam cross each other, is an instantaneous detection area. The detection area has a lateral width equal to a lateral scanning width of the transmitted-light beam, and is moved in a zigzag manner over the entire detection region having a vertical width equal to the vertical scanning width of the light-receiving area, to thereby scan the object. A distance to the object is detected based on time from the transmission of the light beam to the reception of the reflected wave resulting from the reflection of the light beam from the object, and a direction to the object is detected based on a direction of an instantaneous detection area at that time.

A driver interface of the following system according to the present embodiment will be described below.

Figure 3:
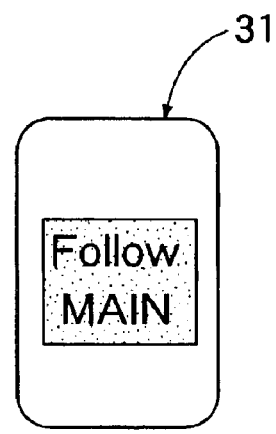
FIG. 3 is a diagram showing a main switch for a travel following system.
Figure 4:
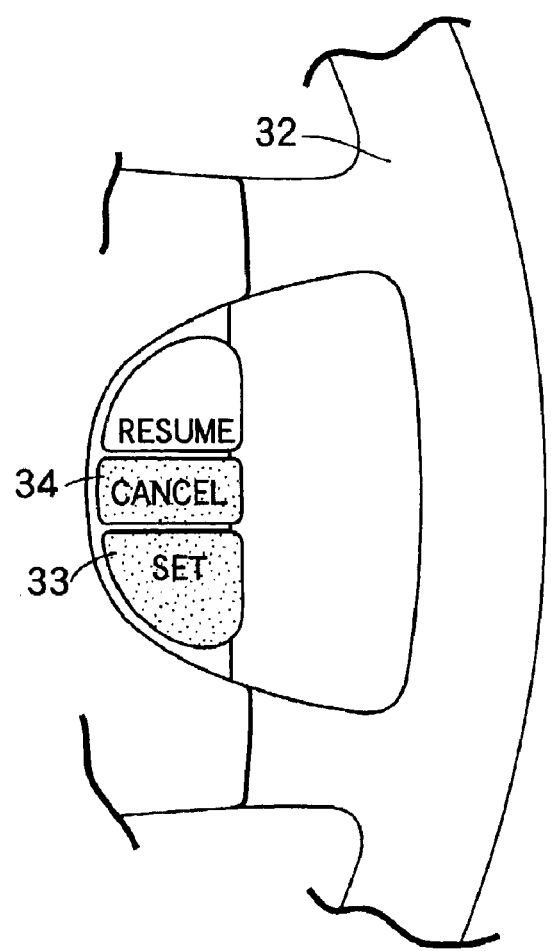
FIG. 4 is a diagram showing a set switch and a cancel switch for the travel following system.

As shown in FIG. 3, a main switch 31 for the following system is mounted at an upper portion of an instrument panel. As shown in FIG. 4, a set switch 33 and a cancel switch 34 are mounted on a steering wheel 32.

Figure 5:
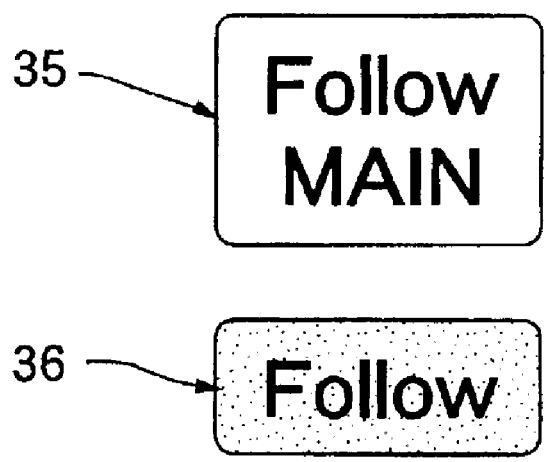
FIG. 5 is a diagram showing a main switch turned-on state indicating lamp and a warning lamp.
Figure 6:
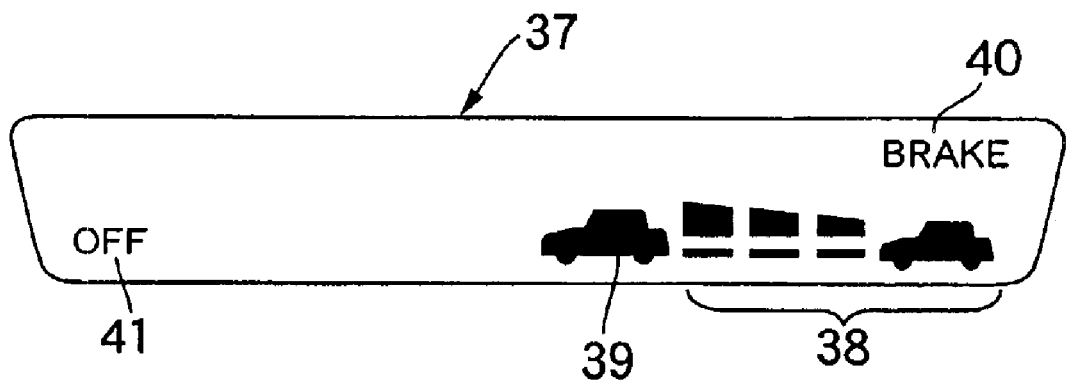
FIG. 6 is a diagram showing a display of the travel following system.

As shown in FIG. 5, a main switch turned-on state indicating lamp 35 and a warning lamp 36 are mounted on a meter panel. The main switch turned-on state indicating lamp 35 is turned on when the main switch 31 is turned on. The warning lamp 36 is turned on when an abnormality is generated in the following system. As shown in FIG. 6, a system operation indication 38 for indicating that the following system is in operation, a preceding vehicle presence indication (a travel following control indication) 39, a brake warning indication 40 and a fail indication 41 are provided on a display 37 mounted in the meter panel, so that they can be turned on. In the embodiment, a preset vehicle-vehicle distance for travel following control is capable of being switched over three stages. When the preset vehicle-vehicle distance is large, all three blocks of the system operation indication 38 are turned on. When the present vehicle-vehicle distance is medium, two of the three blocks are turned on. When the present vehicle-vehicle distance is small, one of the three blocks is turned on.

The outline of the control system for the following system will be described below with reference to FIG. 11.

The following signals are input to the electronic control unit 25: a signal from a motional state-detecting means M1 for detecting a motional state such as a yaw rate, a steering angle and a vehicle speed of the subject vehicle; a signal from a vehicle speed detecting means M3 for detecting the vehicle speed of the subject vehicle; a signal from an object detecting device R and a signal from a control start commanding means 33 (the set switch 33). Based on these signals, the electronic control unit 25 controls the operations of a throttle actuator 42 for opening and closing a throttle valve, a brake actuator 43 for operating a brake device and a buzzer 44 for generating a warning sound.

The electronic control unit 25 includes a preceding vehicle judging means M2, a vehicle speed control means M4, a lower-limit vehicle speed setting means M5, an upper-limit vehicle speed setting means M6 and an informing means M7.

The preceding vehicle judging means M2 judges, as a preceding vehicle, a moving object on a travelling locus of the subject vehicle presumed based on the motional state detected by the motional state-detecting means M1. The lower-limit vehicle speed setting means M5 sets a lower-limit vehicle speed (5 km/hr in the embodiment) on the order of a vehicle speed immediately before stopping or immediately after starting, at which the travel following control is carried out. The upper-limit vehicle speed setting means M6 sets an upper-limit vehicle speed (40 km/hr in the embodiment) at which the travel following control is carried out. In a state in which the control start commanding means 33, that is, the set switch 33 is turned on, the vehicle speed control means M4 controls the vehicle speed by operating the throttle actuator 42 and the brake actuator 43 so that the subject vehicle travels following the preceding vehicle detected by the preceding vehicle judging means M2, when a vehicle speed of the subject vehicle detected by the vehicle speed detecting means M3 is between the lower-limit vehicle speed and the upper-limit vehicle speed. The informing means M7 informs a driver by operating the buzzer 44, when the vehicle speed of the subject vehicle detected by the vehicle speed detecting means M3 is equal to or lower than the lower-limit vehicle speed and when the preceding vehicle in a stopped state is started.

Figure 7:
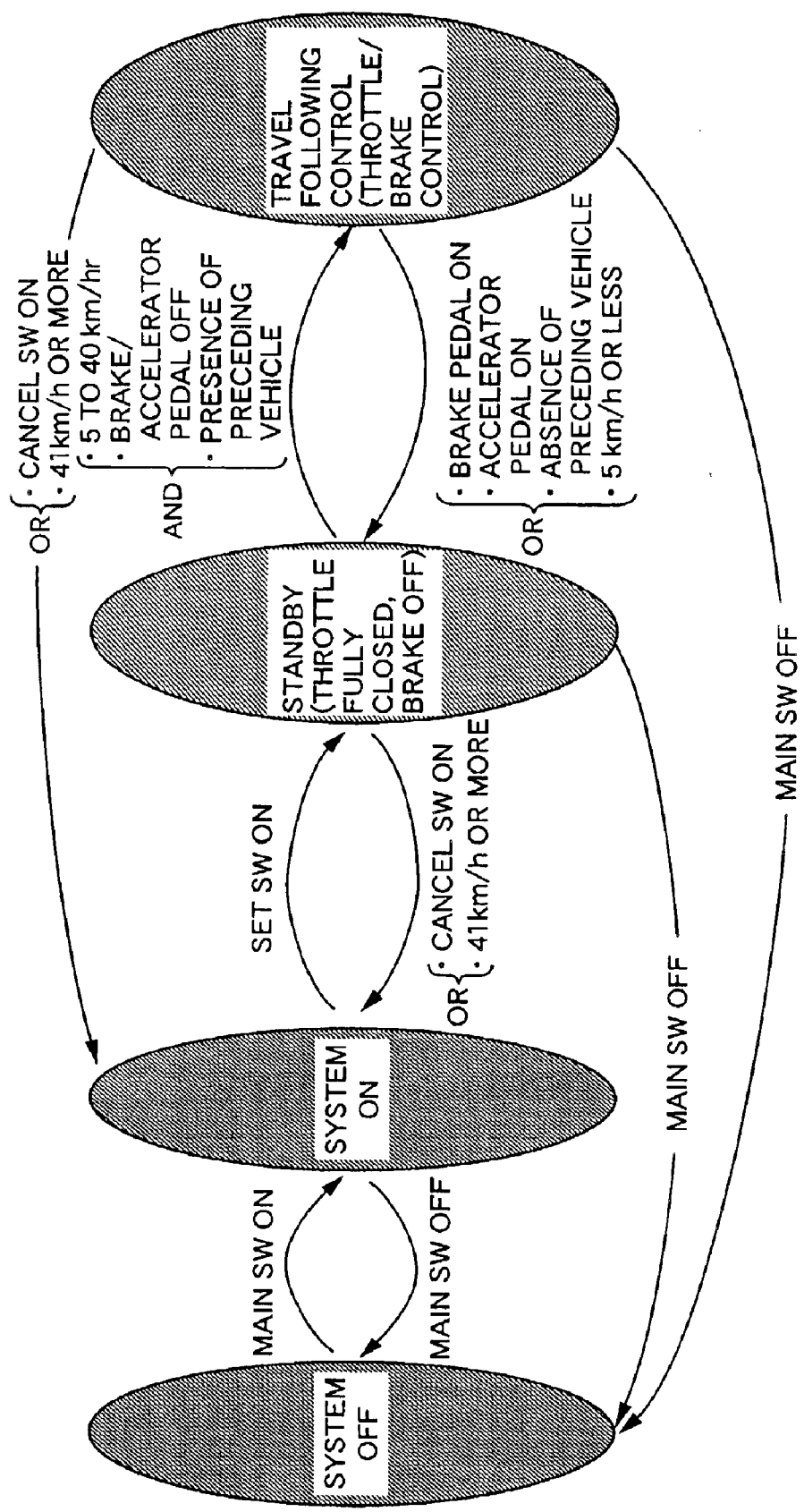
FIG. 7 is a diagram for explaining conditions for switching over various modes of the travel following system.

As shown in FIG. 7, the following system has "system turned-off mode", "system turned-on mode", "standby mode" and "travel following control mode" as main modes. When the main switch 31 is turned on from "system turned-off mode", the mode is changed to "system turned-on mode". When the main switch 31 is turned off from any of "system turned-on mode", the "standby mode" and "travel following control mode", the mode is changed to "system turned-off mode". When the set switch 33 is turned on from "system turned-on mode", the mode is changed to "standby mode". When the cancel switch 34 is turned on from "standby mode" or "travel following control mode", the mode is changed to "system turned-on mode". The following system is adapted to be operated during traveling of the vehicle at a relatively low speed lower than 40 km/hr, and when the vehicle speed is equal to or higher than 40 km/hr in "standby mode" or "travel following control mode", the mode is automatically changed to "system turned-on mode", even if the cancel switch 34 is not turned on.

If all the following conditions are established in "standby mode": (1) the vehicle speed is in a range of 5 km/hr to 40 km/hr; (2) a brake pedal is not operated; (3) an accelerator pedal is not operated; and (4) a preceding vehicle has been detected, the mode is changed to "travel following control mode". A condition that an engine rotational speed is an idling rotational speed may be used in place of the condition (3) that the brake pedal is not operated. If any of the following conditions is established in "travel following control mode": (1) the brake pedal has been operated; (2) the accelerator pedal has been operated; (3) a preceding vehicle is not detected; and (4) the vehicle speed is equal to or lower than 5 km/hr, the mode is changed to "the standby mode". A condition that the engine rotational speed is higher than the idling rotational speed may be used in place of the condition (2) that the accelerator pedal has been operated.

FIG. 8 shows examples of indications on the main switch turned-on state indicating lamp 35, the warning lamp 36 and the display 37.

When the following system is in the system turned-off mode, namely, when the main switch 31 is in a turned-off state, all the main switch turned-on state indicating lamp 35, the warning lamp 36 and the display 37 are turned off.

When the mode is the system turned-on mode, namely, when the main switch 31 is in a turned-on state, the main switch turned-on state indicating lamp 35 is turned on, and the warning lamp 36 and the display 37 are turned off.

When the following system is in the standby mode, namely, when the main switch 31 is in the turned-on state; the set switch 33 is in a turned-on state, a preceding vehicle is not detected and the vehicle speed is in a range of 0 km/hr to 40 km/hr, the warning lamp 36 is turned off; the main switch turned-on state indicating lamp 35 is turned on; and the system operation indication 38 on the display 37 is turned on.

When the following system is in the travel following control mode, namely, when the main switch 31 is in the turned-on state, namely, the main switch 33 is in the turned-on state; the preceding vehicle is not detected; the vehicle speed is in a range of 5 km/hr to 40 km/hr; and neither the accelerator pedal nor the brake pedal is not operated, the warning lamp 36 is turned off; the main switch turned-on state indicating lamp 35 is turned on, and the system operation indication 38 and the preceding vehicle presence indication (the travel following control indication) 39 on the display 37 are turned on.

When the following system is in the brake warning mode, namely, when the preceding vehicle is decelerated during the travel following control, and hence the further depression of the brake pedal of the subject vehicle is required, the warning lamp 36 is turned off; the main switch turned-on state indicating lamp 35 and the system operation indication 38, the preceding vehicle presence indication (the travel following control indication) 39 and the brake warning indication 40 on the display 37 are turned on.

When the following system is in the trouble warning mode, namely, when a trouble occurs in the following system, the warning lamp 36 is turned on; the main switch turned-on state indicating lamp 35 is turned on, and the fail indication 41 on the display 37 is turned on.

The operation when the following system is changed from the stopped state to the travel following control state will be described below with reference to FIG. 9.

As shown in FIG. 9A, the preceding vehicle is in stoppage; the subject vehicle is in stoppage in the rear of the preceding vehicle in a state in which the main switch 31 is in the turned-on state, the set switch 33 is in the turned-on state and the driver has depressed the brake pedal. At this time, the following system is in the standby state, and the system operation indication 38 on the display 37 is in the turned-on state. As shown in FIG. 9B, when the preceding vehicle is started, the buzzer 44 is operated to urge the driver for the starting of the subject vehicle, and the subject vehicle is started in a creeping manner by releasing the brake pedal by the driver who has heard the buzzer. When the vehicle speed reaches 5 km/hr, the following system is changed from the standby mode to the travel following control mode, and the preceding vehicle presence indication (the travel following control indication) 39 in addition to the system operation indication 38 on the display is turned on.

As shown in FIG. 9C, the travel following control to the preceding vehicle is started, and as long as the vehicle speed is in the range of 5 km/hr to 40 km/hr, the travel following control is continued. As shown in FIG. 9D, when the driver has depressed the accelerator pedal to increase the vehicle speed of the subject vehicle to a speed equal to or higher than 40 km/hr, the following system is changed to the system turned-on mode, and the display 37 is turned off.

The operation when the preceding vehicle has been stopped during the travel following control will be described below with reference to FIG. 10.

As shown in FIG. 10A, it is supposed that the subject vehicle traveling at 60 km/hr has approached a preceding vehicle traveling at a speed lower than 40 km/hr. In this case, the main switch 31 is turned on to provide the system turned-on mode, and the display 37 is in the turned-off state. As shown in FIG. 10B, when the set switch 33 is turned on at the time when the subject vehicle is decelerated to a speed lower than 40 km/hr, the following system is changed from the system turned-on mode to the standby mode, and the system operation indication 38 on the display 37 is turned on. As shown in FIG. 10C, when the driver releases the brake pedal or the accelerator pedal, the following system is changed from the standby mode to the travel following control mode, and the travel following control is started by the following system, whereby the system operation indication 38 and the preceding vehicle presence indication (the travel following control indication) 39 are turned on.

As shown in FIG. 10D, when the preceding vehicle is decelerated and as a result, the further depression of the brake pedal is required, the mode of the following system is changed to the brake warning mode, and the brake warning indication 40 is turned on. As shown in FIG. 10E, when the driver depresses the brake pedal, or the vehicle speed reaches to a level equal to lower than 5 km/hr, the following system is changed from the travel following control mode to the standby mode, and the travel following control by the following system is discontinued, whereby the preceding vehicle presence indication (the travel following control indication) 39 is turned off. When the subject vehicle is then stopped, the system is restored to the above-described state shown in FIG. 9A.

When the vehicle speed of the subject vehicle reaches to a speed equal to or lower than 5 km/hr which is the lower limit vehicle speed due to the deceleration of the preceding vehicle during the travel following control, the driver is informed of this fact by the buzzer 44, whereby the driver is urged to conduct the braking operation. Therefore, the driver can immediately carry out the braking operation for stopping the vehicle. By stopping the vehicle by the spontaneous braking operation by the driver in the above-described manner, it is prevented that the driver excessively relies on the following system to be neglectful of the braking operation. Thus, the prompt braking operation by the driver is enabled in case of emergency.

The spontaneous acceleration or deceleration by the driver is enabled at a vehicle speed equal to or lower than 5 km/hr which is the lower limit vehicle speed. Therefore, if the set switch 33 is once operated, it is not required that the set switch 33 is operated every time the vehicle in the stopped state is started, unless the vehicle reaches a level equal to or higher than 40 km/hr which is the upper limit vehicle speed, leading to an enhancement in convenience. Moreover, when the vehicle speed reaches a level equal to or higher than 40 km/hr which is the upper limit vehicle speed, whereby the vehicle speed control is discontinued, the vehicle speed control is suspended until the set switch 33 is subsequently turned on. Therefore, when the vehicle speed is again reduced to a speed lower than the upper limit vehicle speed after the vehicle speed has been increased to a speed equal to or higher than the upper limit vehicle speed to discontinue the vehicle speed control, the unexpected vehicle speed control by the driver is prevented from being started to provide an uncomfortable feeling to the driver.

Although the embodiment of the present invention has been described in detail, it will be understood that various modifications in design may be made within a scope which does not depart from the subject matter of the present invention.

For example, the laser radar device has been employed as the object detecting system R in the embodiment, but a milli-wave radar device or a television camera may be employed.

In addition, the driver is informed by another means such as a chime, a voice and a lamp in place of the buzzer 44 employed in the embodiment.

Further, the values of the upper and lower limit vehicle speeds are not limited to those in the embodiment and may be appropriately changed.

Yet further, the driver is informed by the buzzer 44 when the vehicle speed reaches to the level equal to or lower than the lower limit vehicle speed in the embodiment, but the driver may be informed when the vehicle speed nears the lower limit vehicle speed.

What is claimed is:

1. A travel following system comprising:
an object detecting device for detecting an object in a direction of travel of a subject vehicle;
a motional state detecting means for detecting a motional stale of the subject vehicle;
a preceding vehicle judging moans for judging a preceding vehicle which the subject vehicle is to follow, based on outputs from the object detecting device and the motional state detecting means;
a vehicle speed detecting means for detecting a vehicle speed of the subject vehicle; and
a vehicle speed control means for controlling the vehicle speed of the subject vehicle so that the subject vehicle follows the preceding vehicle judged by the preceding vehicle judging means, wherein said system further includes:
a lower limit vehicle speed setting means for previously setting a lower limit vehicle speed to control the vehicle speed by the vehicle speed control means, said vehicle speed control means being adapted to ensure that a vehicle speed control is discontinued at a vehicle speed between the lower limit vehicle speed set by the lower limit vehicle speed setting means and a vehicle speed in a stopped state, thereby permitting a vehicle speed control conducted by a driver, and the vehicle speed control is carried out at a vehicle speed exceeding the lower limit vehicle speed in a state in which an accelerating or decelerating operation is not conducted by the driver;
an upper limit vehicle speed setting means for previously setting an upper limit vehicle speed to control the vehicle speed by the vehicle speed control means; and
a control start commanding means for instructing the vehicle speed control means to start the vehicle speed control upon operation by the driver, said vehicle speed control means being adapted to ensure that the vehicle speed control is discontinued when the vehicle speed becomes a level equal to or higher than the upper limit vehicle speed, and wherein the vehicle speed becomes again lower than the upper limit vehicle speed, the vehicle speed control is suspended until the operation of the control start commanding means is conducted.

2. A travel following system according to claim 1, further including an informing means for informing the driver of that the vehicle speed is immediately nearing a level equal to or lower than the lower limit vehicle speed, or that the vehicle speed has reached the level equal to or lower than the lower limit vehicle speed.

3. A travel following system according to claim 2, wherein the informing means informs the driver of contents urging the driver for a decelerating operation.

4. A travel following system comprising:
an object detecting device for detecting an object in a direction of travel of a subject vehicle;
a motional state detecting means for detecting a motional state of the subject vehicle;
a preceding vehicle judging means fur judging a preceding vehicle which the subject vehicle is to follow, based on outputs from the object detecting device and the motional state detecting means;
a vehicle speed detecting means for detecting a vehicle speed of the subject vehicle; and
a vehicle speed control means for controlling the vehicle speed of the subject vehicle so that the subject vehicle follows the preceding vehicle judged by the preceding vehicle judging means;
wherein said system further includes:
a lower limit vehicle speed setting means for previously setting a lower limit vehicle speed to control the vehicle speed by the vehicle speed control means;
said vehicle speed control means being adapted to ensure that a vehicle speed control is discontinued at a vehicle speed between the lower limit vehicle speed set by the lower limit vehicle speed setting means and a vehicle speed in a stopped state, thereby permitting a vehicle speed control conducted by a driver, and that when the vehicle speed exceeds the lower limit vehicle speed after the vehicle speed control is discontinued, the vehicle speed control is carried out in a state in which an accelerating or decelerating operation is not conducted by the driver.

5. A travel following system according to claim 4, further including an informing means for informing the driver that the vehicle speed is immediately nearing a level equal to or lower than the lower limit vehicle speed, or that the vehicle speed has reached the level equal to or lower than the lower limit vehicle speed.

6. A travel following system according to claim 5, wherein the informing means informs the driver of contents urging the driver for a decelerating operation.

* * * * *